(12) United States Patent
Beladakere et al.

(10) Patent No.: US 7,535,893 B1
(45) Date of Patent: May 19, 2009

(54) TDM SERVICES USING A PACKET-SWITCHED FABRIC

(75) Inventors: Jayaram K. Beladakere, Rohnert Park, CA (US); Jose L. Enciso, Santa Rosa, CA (US); John A. Fletcher, Novato, CA (US); Richard S. Lopez, Corte Madera, CA (US); Robert W. McFarland, Santa Rosa, CA (US); Adam A. Weiss, Minden, NV (US)

(73) Assignee: Mahi Networks, Inc., Petaluma, CA (US)

( * ) Notice: Subject to any disclaimer, the term of this patent is extended or adjusted under 35 U.S.C. 154(b) by 796 days.

(21) Appl. No.: 10/728,466

(22) Filed: Dec. 5, 2003

(51) Int. Cl.
  *H04L 12/66* (2006.01)
  *H04L 12/28* (2006.01)
  *H04B 7/212* (2006.01)
  *H04J 3/00* (2006.01)

(52) U.S. Cl. .................... 370/353; 370/356; 370/395.1; 370/442; 370/498; 370/395.4

(58) Field of Classification Search ................. 370/503, 370/498, 468, 465, 458, 443, 442, 401, 400, 370/375, 372, 356, 352–353, 395.1, 395.4
  See application file for complete search history.

(56) References Cited

U.S. PATENT DOCUMENTS

| | | | | |
|---|---|---|---|---|
| 4,922,487 A * | 5/1990 | Eilenberger et al. | ......... | 370/411 |
| 5,043,979 A * | 8/1991 | Sakurai et al. | .............. | 370/392 |
| 6,876,650 B2 * | 4/2005 | McCrosky et al. | .......... | 370/370 |
| 6,956,851 B1 * | 10/2005 | McKeown et al. | .......... | 370/369 |
| 7,187,672 B1 * | 3/2007 | Vishnu | ....................... | 370/360 |
| 7,218,637 B1 * | 5/2007 | Best et al. | ................ | 370/395.4 |
| 7,436,815 B2 * | 10/2008 | Caldara | ..................... | 370/352 |
| 2002/0191588 A1 * | 12/2002 | Personick | ................... | 370/352 |
| 2003/0026250 A1 * | 2/2003 | Fang | .......................... | 370/386 |
| 2005/0058137 A1 * | 3/2005 | Carlson et al. | ........... | 370/395.4 |

* cited by examiner

*Primary Examiner*—Brenda Pham
*Assistant Examiner*—Nittaya Juntima

(57) ABSTRACT

Providing TDM services over a packet-switched fabric. Distributed scheduling is provided by overlaying a synchronized frame structure on the packet switching of the packet-switched fabric. Contention-free scheduling is achieved by prescheduling TDM traffic with the distributed scheduling mechanism. The result is a deterministic timing procedure suitable for switching TDM traffic in a packet-switched fabric.

17 Claims, 7 Drawing Sheets

TDM SERVICES USING A PACKET-SWITCHED FABRIC

FIELD

The disclosure relates to network switching. Specifically, the disclosure relates to providing TDM services over a packet-switched fabric.

BACKGROUND

Traffic on a switching system may be thought of as either TDM (Time-Division Multiplexed) traffic or PDU (Protocol Data Unit) traffic. TDM traffic has stricter requirements on latency, jitter, and bit errors as compared to PDU traffic. Because of the characteristic differences in the two types of traffic, switching is traditionally performed on different types of switching fabrics.

TDM traffic is typically switched over a circuit switching fabric, which provides a dedicated line for a TDM stream from an ingress port/device to an egress port/device. A so-called TDM system, or a switching system with a TDM fabric (based on circuit switching) will also typically use a timeslot allocation mechanism to compute circuit allocations through the fabric. The use of the concepts of timeslots and timeslot allocation in conjunction with the circuit switching provides for a switching mechanism that allows a dedicated path for a TDM stream for an allotted period of time. Some systems will also allow for rearrangement of the timeslot allocation. Such systems then provide a time-space (reallocation of timeslots-circuit switching) switch for switching TDM traffic. Circuit switching provides the benefit to TDM traffic that it is deterministic, and the use of a circuit by one TDM stream comes at the exclusion of all other streams. However, data traffic is typically not switched with a circuit-switching mechanism.

In contrast to circuit-switched systems are packet-switched systems. A packet-switched (or cell-switched) system deals with ingress/egress data in single packets, or cells. As used herein, "packet" and "cell" are to be understood to be interchangeable. They refer to a packet, a cell, or any other similar data structure. For example, they may refer to group of bits, where certain bits represent a payload, and other bits may represent a header, or some sort of addressing bits to enable routing of the cell/packet to its proper destination. Rather than having a dedicated circuit over which to transmit data, a packet-switched system uses a scheduler to arbitrate among cells contending for the same output port/device. PDU data is dealt with on a single packet/cell basis in the switching fabric. The scheduler may use a number of methods known in the art to determine the best allocation of cells among available output ports, at least including algorithms based on traffic priority, fair queuing, round robin, etc.

Efforts have been made to use a single switch to handle both TDM and PDU traffic. Current methods involve the use of hybrid fabrics as in FIG. 1, or TDM emulation as in FIG. 2. Referring to FIG. 1, a prior art system is illustrated with a native TDM (i.e., circuit switched) fabric. TDM linecards 111 are ingress/egress devices dedicated to TDM traffic. TDM traffic is received from a network (not shown), switched over TDM fabric 101 via circuit switching as discussed above, and returned to TDM linecards 111 to forward the TDM traffic to its destination on the network. PDU linecard 121, in contrast, is dedicated to receipt of PDU traffic. Because TDM fabric 101 is unable to groom the PDU traffic, TDM fabric 101 switches any channels 131 containing PDU traffic to packet fabric 102. All cell switching is performed by packet fabric 102.

Referring to FIG. 2, a prior art configuration of a switching fabric using packet switching is illustrated. In this configuration, PDU linecard 221 transfers ingress PDU traffic to packet fabric 201 to groom the traffic and return it to PDU linecard 221 to be transmitted out to its destination. TDM linecards 211, however, are supported by packet fabric 201 through the use of circuit emulation. Circuit emulators 212 are used at the input and output of packet fabric 201 and from/to TDM linecards 211. Circuit emulators 212 prepare the TDM traffic to be switched over data fabric 201, such as by preparing the TDM traffic to be seen by packet fabric 201 as highest-priority PDU traffic.

Although there are many possible advantages in cost, size, and complexity to provide both TDM and PDU traffic support in a single fabric, the current methods in the art either do not adequately provide for switching of PDU traffic, or they introduce jitter, latency, and/or cell loss in TDM traffic.

BRIEF DESCRIPTION OF THE DRAWINGS

The following disclosure is illustrated by way of example, and not by way of limitation, in the figures of the accompanying drawings in which like reference numerals refer to similar elements.

DETAILED DESCRIPTION

The disclosure describes providing conflict-free allocation of TDM traffic between ingress and egress devices using a packet-switched fabric. The ingress and egress devices may be referred to herein as switch interfaces, or switch interface devices. A time-space switch is overlaid onto the packet-switched system. With this the packet-switched fabric is able to support switching of PDU traffic and TDM traffic while meeting the strict switching requirements of the TDM traffic. In one embodiment, the use of timeslot allocation tables on the switch interfaces to provide prescheduling of TDM traffic, together with a centralized, synchronized timing structure provides the time-space switching overlay.

Figures 1, 2:
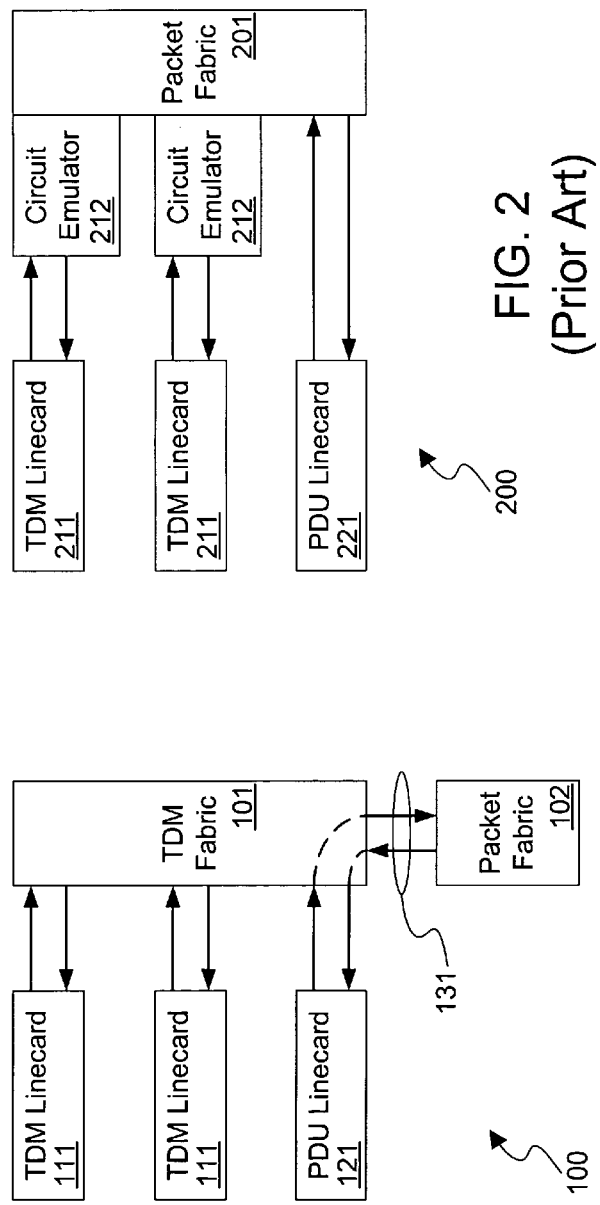
FIG. 1 is one embodiment of a prior art configuration of providing combined TDM and PDU services.
FIG. 2 is one embodiment of a prior art configuration of providing combined TDM and PDU services.
Figure 3:
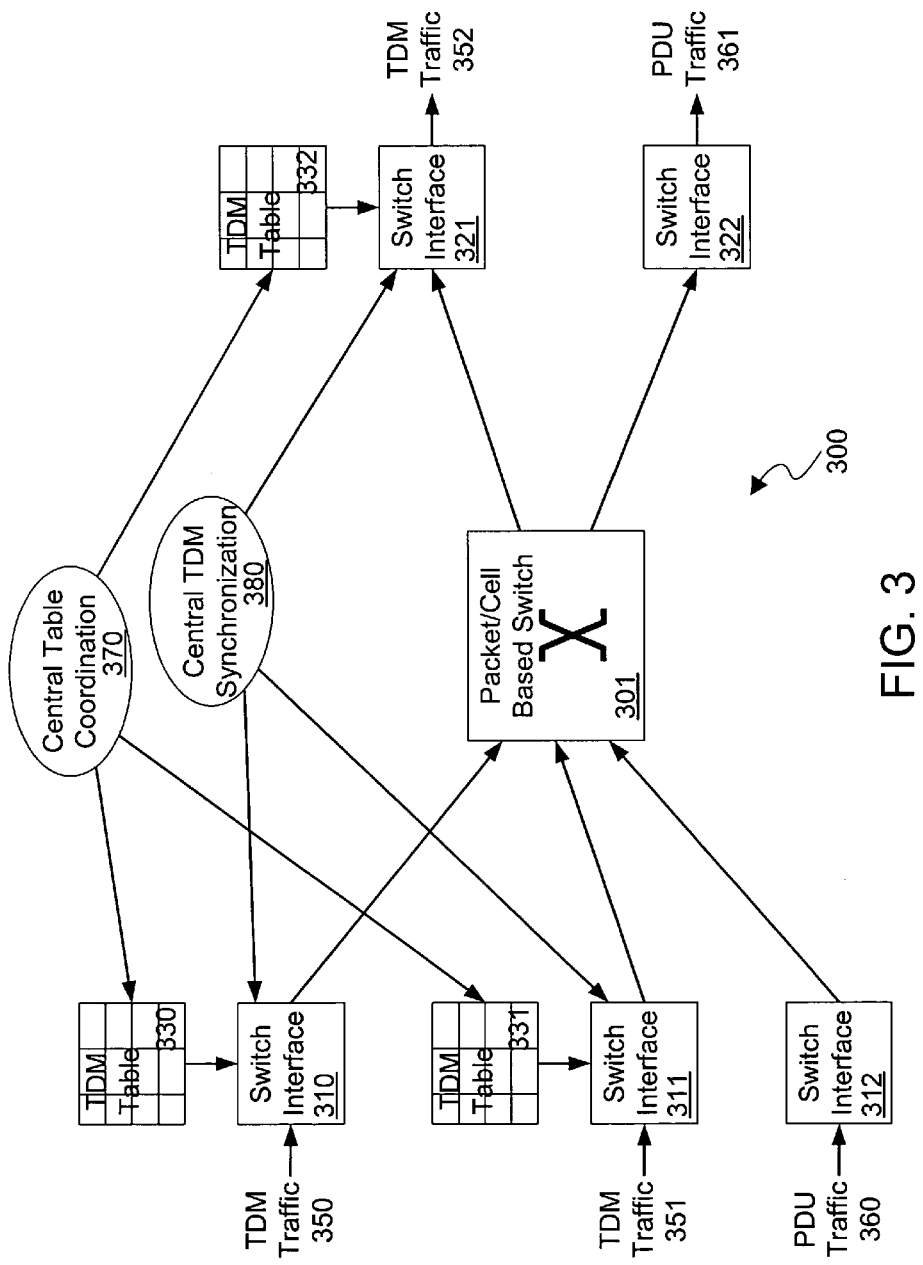
FIG. 3 is one embodiment of a system that provides TDM services over a packet-switched fabric.

FIG. 3 is one embodiment of a system that provides TDM services over a packet-switched fabric. System 300 depicts centrally coordinated timeslot allocation tables and global synchronization signals on a packet/cell based switch fabric. Switch interfaces 310-312 receive traffic streams from a network (not shown). As shown, switch interfaces 310-311 receive TDM traffic streams 350-351, and switch interface 312 receives PDU traffic stream 360. There may be any combination of PDU and TDM traffic received by system 300, and the description herein would still apply. The traffic streams from switch interfaces 310-312 are switched over packet/cell based switch 301 to switch interfaces 321-322.

Switch interfaces 310-311 and 321 include TDM tables 330-332, respectively. TDM tables 330-332 will be more fully discussed below. Relevant to this discussion is the fact that TDM tables 330-332 provide for conflict-free allocation of TDM traffic over system 300. Because the TDM traffic allocation is conflict-free, system 300 is deterministic in its switching of TDM traffic, allowing system 300 to meet the strict requirement for switching TDM traffic.

TDM tables 330-332 are coordinated by central table coordination 370. Central table coordination 370 is responsible for populating TDM tables 330-332 in such a way that there is no contention in the system for TDM traffic. Contention-free allocation means that if an ingress device transmits a cell of TDM traffic to a particular egress device on a particular timeslot, there will be no other ingress devices contending for TDM traffic to be sent to that particular egress device on that particular timeslot. Examples of using a contention-free allocation algorithm will be given below. It is important here simply to note that central table coordination 370 may use a contention-free allocation algorithm to pre-schedule the TDM traffic so that the cells of TDM traffic do not require arbitration at the packet/cell based switch 301.

Central TDM synchronization 380 coordinates the frame structure overlaying system 300. While the frame structure is intrinsically linked to TDM tables 330-332, as will be discussed further below, central TDM synchronization provides a synchronization signal to switch interfaces 310-311 and 321 handling TDM traffic to coordinate use of the frame. In this manner, TDM tables are utilized in a synchronous manner that allows each switch interface to know when to transfer traffic on the frame, and guarantees that traffic switched in a synchronous manner will be conflict free.

Because central TDM synchronization 380 and central table coordination 370 provide for a conflict-free TDM traffic allocation across system 300, note that there is no need for a central scheduler for TDM traffic, as with the traditional systems. The switch can still have a central scheduler for PDU traffic; it is not required for TDM traffic. Packet/cell based switch 301 in traditional systems would include a central scheduler or arbiter, because traffic allocation of ingress traffic to egress devices would be handled at switch 301. However, because of the conflict-free allocation provided by TDM tables 330-332 in conjunction with central table coordination 370 and central TDM synchronization 380, there is no need to arbitrate TDM traffic at switch 301. The prescheduling of TDM traffic makes a distributed scheduler across system 300.

Because of the prescheduling, and the coordination of the traffic at packet/cell based switch 301, note that the switch fabric has a distributed nature. That is, switching system 300 includes a switching core, switch 301, and may include elements such as switch interfaces 310-312 and 321-322 that provide functions integral to the operation of the overall switch, and are physically separate and distinct from the switching core. These interfaces may be interconnected using many technologies (e.g., backplane, electrical, cables, optical fiber, etc.). This provides another advantage in that there will be inter-switch interface awareness in system 300. Inter-switch interface awareness means that switch interfaces 310-312 and 321-322 may be aware of each other, and can address each directly through packet/cell based switch 301, rather than relying on a dedicated line for TDM traffic or having a central scheduler determine how to interconnect the traffic from one switch interface to another.

In one embodiment there are two copies of TDM tables 330-332 on each of switch interface devices 310-311 and 321. The second copy of TDM tables 330-332 provides a "standby" copy. In this manner central table coordination 370 may make changes to a standby copy of TDM tables 330-332 when changes are made in traffic allocation in system 300. Because the standby copy is used for updates, the working copy can continue to be used to by switch interface devices 310-311 and 321 until a time that central TDM synchronization 380 indicates to swap the working copy for the standby copy. For example, central TDM synchronization 380 may direct switch interfaces 310-311 and 321 to discontinue using the current working copy of TDM tables 330-332 at the beginning of a next frame. The copy that had been the standby copy that was modified to reflect changes in traffic allocation in system 300 is then employed as the current working copy, until, for example, another change in the system is made.

Switch interfaces 312 and 322 are shown handling PDU traffic. In one embodiment the coordination of PDU traffic within system 300 is that certain timeslots on the frame will be dedicated to the switching of PDU traffic. Thus, on certain timeslots conflict-free TDM traffic is switched, and on certain other timeslots no TDM traffic is switched, and the timeslot is dedicated to the switching of PDU traffic. In another embodiment, TDM traffic will be allocated conflict-free, and if there is an egress device on the timeslot that could be used for PDU traffic without causing conflict with the TDM traffic, PDU traffic will be switched to that egress device during that timeslot. Thus, PDU traffic is transferred to packet/cell based switch 301, and arbitration is used to switch the PDU traffic in a manner that avoids conflict with the TDM traffic switching.

Figure 4:
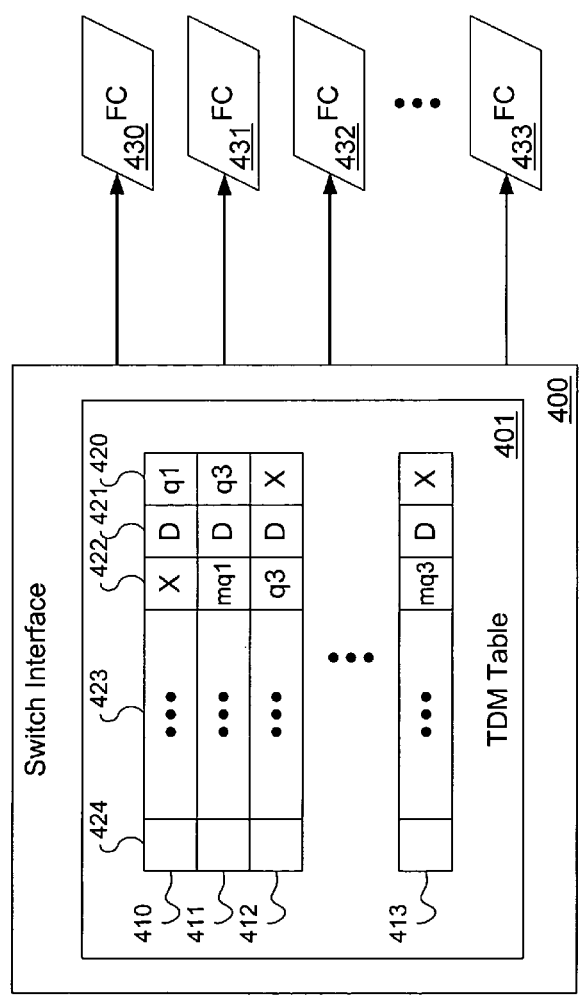
FIG. 4 is one embodiment of a switch interface with an allocation table.

FIG. 4 is one embodiment of a switch interface with an allocation table. Switch interface 400 includes table 401. Table 401 is shown with rows 410-413 of entries. The number of rows depicted in FIG. 4 is for purposes of illustration only, and more or fewer rows may be included within table 401. Each of rows 410-413 represents an interconnection between switch interface 400 and fabric core devices FC 440-443. Thus, the entries in rows 410-413 depict one example of an order in which traffic can be sent over the fabric between an ingress and an egress device.

Columns 420-424 divide rows 410-413 into separate entries. Column 423 indicates that table 401 will have rows 410-413 of a maximum number of entries M. Thus, the entry at column 423 may represent multiple entries, which may or may not all be utilized by switch interface 400 for particular system configurations. For example, table 401 may include rows 410-413 each having 32 or 64 entries, depending on the configuration of the system of which switch interface 400 is a part. Table 401 may have a maximum row length of M entries, and only utilize N of the entries. For example, rows 410-413 may each include 64 entries, 33 of which may be populated, leaving 31 entries blank in each row 410-413. Each of rows 410-413 may include 128 entries, of which 81 are populated. The number of potential entries and the number of populated entries is not essential to the disclosure herein, and a switching system may have different configurations based on the implementation of system 400.

Table 401 is used in conjunction with a frame structure overlaid onto switching system 400. The frame has multiple timeslots in which a cell/packet of data will be transmitted from switch interface 400 to the fabric core. In one embodiment, each entry in rows 410-413 corresponds to a timeslot within the frame associated with the row. The size of rows 410-413 and the number of entries populated could be based, for example, on the frame structure that is intended to overlay the switching of traffic over FC 430-433. The table supports a certain number of entries (e.g., 64, 128) and the frame structure may utilize all or a part of the table, depending on the length of the frame itself. For example, the frame length may be such that only 30 of the 64 entries are usable. Once a pass has been made at all entries in the table, the frame repeats. Thus, the frame may define how many entries in the table are actually usable for timeslot allocations.

A packet-switched fabric generally employs a switch interface-to-switch protocol to achieve communication between the switch interface and the switching core. One such mechanism is a bid-grant process. In such a process, an ingress device may make a bid for an egress device to which it intends to send a packet of data if the bid is granted. If the central scheduler grants the bid, the ingress device transmits the packet to the switch fabric, which will switch the packet to the target egress device. In one embodiment, a ready-transmit process is employed, where switch interface 400 receives a ready indication from the fabric core FC 430-433. Once the fabric core is ready, switch interface 400 may transmit according to the allocation of table 401. Other examples of switch interface-to-switch mechanisms include, but are not limited to, polling and handshaking, as are known in the art.

In addition to the use of a communication mechanism between the switch interface and the switch, there may also be introduced the use of queues, buffers, or other device indirection techniques. Rather than addressing a device directly and allowing the device to receive the traffic directly, an ingress switch interface may address a queue or other indirection device. Upon a grant, for example, the ingress device transmits a cell/packet from a queue to an egress device through the fabric.

Thus, switch interface 400 will transmit to an appropriate target according to the entries in each row 410-413 of table 401. Thus, each column 420-423 shows the queue allocation of a single timeslot on the frame for a switch interface. When transmission from all switch interfaces in the system is synchronized a combined look at all tables on those interfaces could give timeslot allocation for the entire system.

In one embodiment, the entries of table 401 are populated according to an allocation procedure that prevents conflict down each column 420-424 across all devices, and so ensures conflict-free scheduling at fabric core devices FC 430-433 for each timeslot on the frame. When a conflict-free allocation algorithm is used to populate table 401, traffic will be switched exactly as transmitted from switch interface 400, because there is no contention to arbitrate, and no transmitted cell will fail due to conflict with another cell destined for the same egress device. In this manner, the entries in table 401 could be said to be prescheduled, because there is no need for a central (TDM) scheduler to arbitrate to resolve contention. The columns 420-424 of table 401 show a big picture of what egress ports/devices will be used on a given timeslot. Thus, as depicted in FIG. 4, column 420 includes entries referencing "q1" and "q3," with other entries marked as "X." Accordingly, a cell will arrive at FC 430 for an egress device corresponding to the device "q1" and a cell will arrive at FC 431 for egress device "q3." Note that entries at column 420, rows 412 and 413 are marked "X." An "X" is a generic symbol as used here to indicate that switch interface 400 is not to transfer a cell on the timeslot corresponding to the row in which the "X" entry is found. In this case, the timeslot represented by column 420 is not available for either TDM traffic or PDU arbitration. In such a case, switch interface 400 may, e.g., send an empty cell, as is known in the art. Thus, there will be no contention for egress devices when table 401 is populated according to a conflict-free allocation procedure.

As mentioned above, because there will be no contention for egress devices, there is no need for a central TDM scheduler at the fabric core. The distributed prescheduling of TDM traffic in the switch interfaces of a system is sufficient to have TDM traffic arrive at its destination without conflict.

In one embodiment there are two copies of table 401 (for purposes of discussion, assume they are called 401A and 401B) stored on switch interface 400. A central controller (not shown) indicates whether to use TDM table 401A or 401B. The alternate versions of TDM table 401 allows switch interface 400 to operate with an active or working TDM table 401A, and have a shadow or standby TDM table 401B. Under normal operation, switch interface 400 will use working TDM table 401A. When a cross-connect is added or removed, a central controller will use an allocation algorithm to adjust the current scheduling of traffic across the system. These changes may be transmitted to switch interface 400 when made, and switch interface 400 will update standby TDM table 401B. Alternatively, the central controller may transmit a new version of standby TDM table 401B that has the modifications in it. At an appointed time, or on an appointed signal, switch interface 400 would be able to change from using TDM table 401A to the updated standby TDM table 401B. The updated standby TDM table is then considered the working TDM table, and vice versa. Thus, the use of the two tables allows for timely operation in a dynamic system where traffic streams are added or dropped from the system.

Population of table 401 may be performed by an algorithm designed to produce deterministic switching of TDM traffic. Algorithms are known that perform such allocations for unicast traffic. Thus, for unicast traffic, all TDM traffic will be non-conflicting. However, multicast traffic is typically handled with heuristics-based approaches because no algorithms of polynomial time complexity are available (NP-complete). There are many resources available that discuss conflict-free allocation algorithms, such as F. K. Huang, "The Mathematical Theory of Nonblocking Switching Networks," World Scientific, Singapore, 1998, J. Hui, "Switching and Traffic Theory for Integrated Broadband Networks," Kluwer Academic Press, Deventer, Netherlands, 1990, and H. J. Chao, Z. Jing and S. Y. Liew, "Matching Algorithms for Three-Stage Bufferless Clos Network Switches," pp. 46-54, IEEE Communications Magazine, October 2003. One such algorithm is a Slepian-Duguid algorithm that in one embodiment may be modified to support multicast traffic. Such a modification to create a Slepian-Duguid-based algorithm may include providing for first attempting to schedule new multicast traffic in a timeslot that already contains multicast traffic, and then attempting to add multicast traffic to timeslots that have only unicast traffic, or no scheduled traffic at all.

Figure 5:
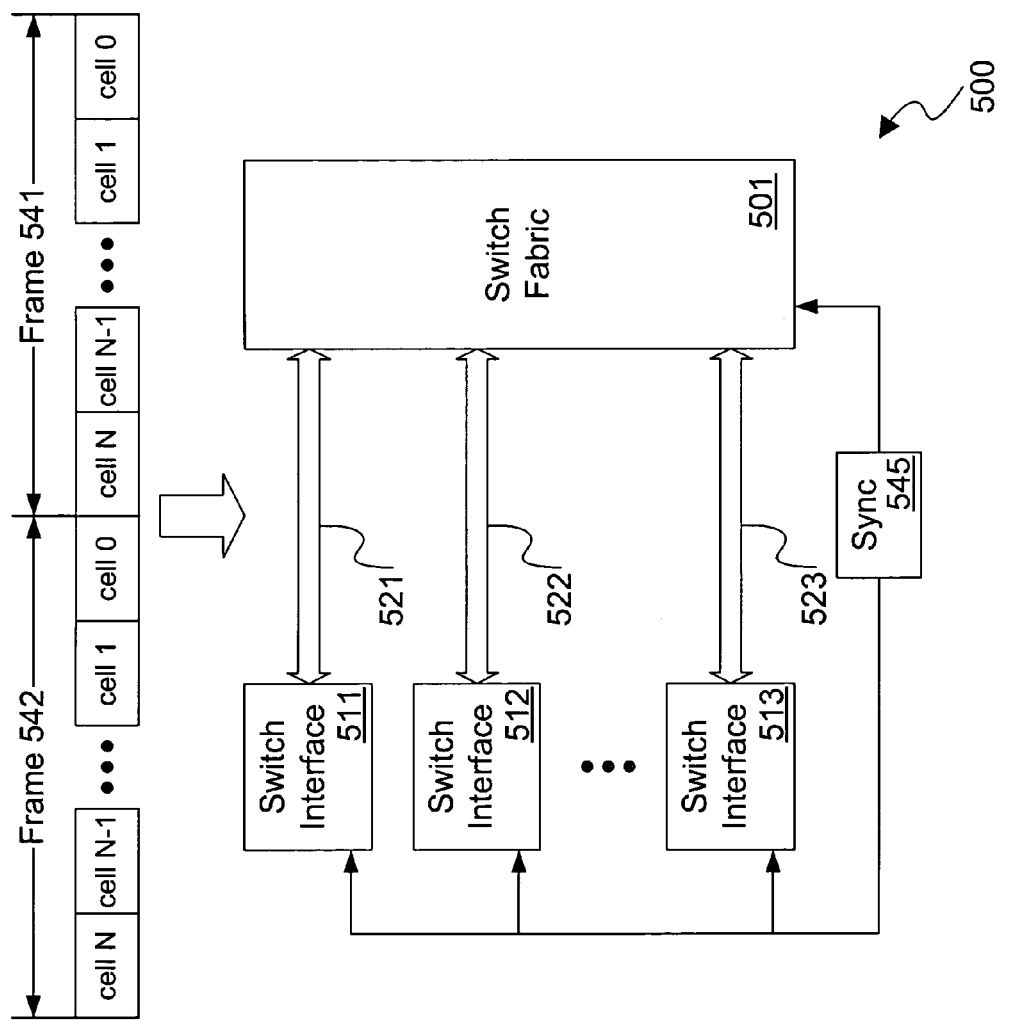
FIG. 5 is one embodiment of a synchronized repeating frame structure overlaying a packet-based fabric.

FIG. 5 is one embodiment of a synchronized repeating frame structure overlaying a packet-based fabric. Switch fabric 501 is a packet-switched fabric. Recalling the drawbacks associated with attempting to switch TDM traffic over a packet-switched fabric, system 500 is designed to switch TDM and PDU traffic over the same switch fabric without the addition of latency, jitter, or cell loss in the TDM traffic. In one embodiment system 500 has a traditional interconnection between switch interfaces 511-513 and switch fabric 501, and adds an overlaid synchronized frame structure. Note that the architecture of switch fabric 501 is not limited by the depiction in FIG. 5. Switch fabric 501 may include one or more physical devices. Switch fabric 501 may or may not include all elements of the switching fabric. That is, elements of the switching fabric of system 500 may be physically located off of the device(s) that make up switch fabric 501; for example, elements of the switching fabric may be located on switch interfaces 511-513.

Switch interfaces 511-513 interface with switch fabric 501 over links 521-523. Because of the configuration of system 500 discussed below, switch interfaces 511-513 may be any combination of PDU or TDM switch interfaces. Whether there is a high quantity of PDU or TDM traffic, the following will apply. TDM streams are organized into frames 541-542 based on TDM traffic tables located on switch interfaces 511-513. A snapshot in time of links 521-523 may show the frame structure overlay of system 500, as traffic on the link may be logically conceived of as having the form of frames 541-542. The cells are transmitted during timeslots on frames 541-542. As each cell arrives at switch fabric 501, the cells are switched to their destinations.

Each cell will contain a number of bytes (e.g., 40, 64, 80), with a payload and a header. The header will consist of a number of bytes (e.g., 4, 8), and the balance of the bytes in the cell is the payload. The cells are transmitted over each link 521-523 from switch interfaces 511-513, respectively. In one embodiment, the cells are placed on the links according to tables on switch interfaces 511-513, the tables populated according to a contention-free allocation algorithm. Both frames 541 and 542 have N cells. The number of cells used depends upon the implementation that is desired for system 500. For example, frames 541 and 542 may have a number of cells (e.g., 32, 48, 64).

The timeslots of frames 541-542 are populated with cells by switch interfaces 511-513 over a corresponding link interconnecting switch interfaces 511-513 with switch fabric 501. In one embodiment, a contention-free allocation algorithm is used to populate tables in switch interfaces 511-513, such as those discussed with respect to FIG. 4, making it so that all TDM traffic sent to any respective egress device will be switched without contention or arbitration. In one embodiment each switch interface 511-513 is interconnected with various physical devices included in switch fabric 501 (e.g., crossbar devices). The mapping of all connections or flows on a given timeslot shows the interconnection of ingress devices to egress devices. The contention-free algorithm may provide for allocation of connections within a given timeslot (space switching component). The use of multiple timeslots in a frame also means the algorithm may provide for allocation of the connections among the different timeslots of the frame (time switching component). These two aspects allow for dynamic addition and removal of cross-connects. Combining these components creates a space-time switching procedure operating over the normal packet switching scheme of a packet-switched fabric. The rearranging of flows of TDM traffic is important in providing for the deterministic switching of the TDM traffic.

Even though the cells in the timeslots of the frames on links 521-523 may be prescheduled, if each link transmitted cells to the fabric in a manner asynchronous as compared to other links, the contention-free nature of the prescheduling may be nullified by timing offsets. To make the prescheduling effective, the frames on each link should be synchronized so that the contention-free ordering of cells may be preserved. Sync 545 provides a synchronization signal to each of switch interfaces 511-513 as well as to the switch fabric 501. Sync 545 may be a circuit on a switch interface or on a central controller (not shown), or a process executed on a master switch interface or a central controller. In one embodiment sync 545 provides a digital signal (e.g., indicating a start of frame) over an out-of-band signal channel, or over a dedicated control line. Sync 545 may also be implemented by a timing signal indicated by toggling a logic level on an input of the devices in system 500. In one embodiment, sync 545 provides a start-of-frame indication signal that indicates to the devices of system 500 when a frame begins.

In one embodiment the physical implementation is different for different links. For example, link 521 may be an optical fiber, and link 522 may be a cable connection, a backplane connection, or a copper line, and/or link 521 may be longer than link 522. In cases where the links 521-523 have different physical characteristics, synchronized timing alone may not be sufficient to correct timing differences. For example, consider a system where physical characteristics of link 521 cause approximately a half timeslot delay as compared to link 522. If cell 0 frame 541 is directed to a certain egress device on link 521, and cell 1 is directed to the same device (but now it is one timeslot behind cell 0) on link 522, a half-timeslot delay will mean that cell 1 on link 522 will arrive while cell 0 from link 521 is being serviced. Thus, even if switch interfaces 511 and 512 transmit on their respective links 521 and 522 at the same synchronized timing, conflict may result. Therefore, in one embodiment deskew buffers are added at switch fabric 501 and at switch interfaces to correct timing differences (and also at switch interfaces for traffic coming out of the fabric).

Figure 6:
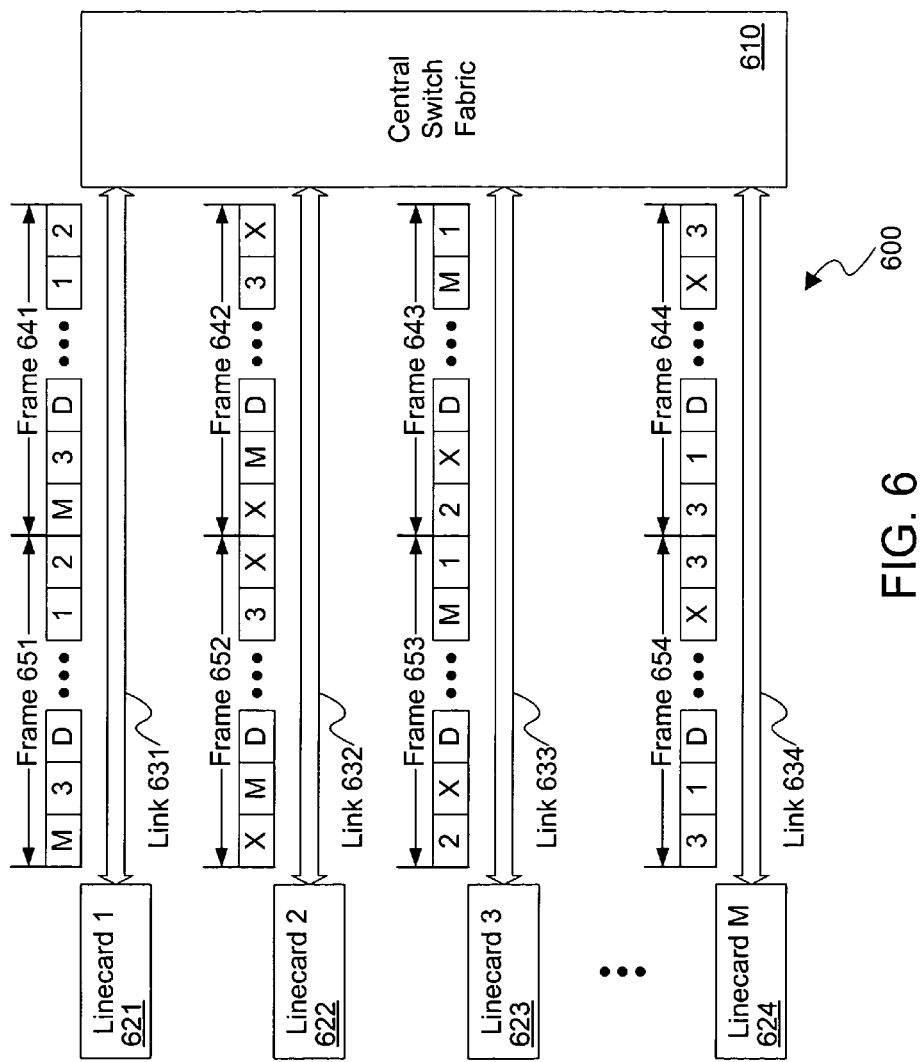
FIG. 6 is one embodiment of contention-free traffic allocation in a synchronized frame structure overlaying a packet-based fabric.

FIG. 6 is one embodiment of contention-free traffic allocation in a synchronized frame structure overlaying a packet-based fabric. System 600 illustrates one example of a detailed look at a system similar to that of FIG. 5 in operation. System 600 includes central switch fabric 610. Central switch fabric 610 is a packet-switched switching fabric. In one embodiment central switch fabric 610 includes only the central core of the switching fabric, with other components of the switching fabric physically located on other devices, such as linecards 621-624. Central switch fabric 610 may be one or more physical devices, or multiple circuits located on one or more physical devices.

System 600 includes linecards 621-624. In one embodiment the linecards 621-624 are integrated linecard devices, with both ingress and egress functions located on a single device. The device may physically be one or more chipsets, ASICS, or even one or more circuit boards acting in conjunction as a single switching device. System 600 is not limited to any particular physical partitioning of switch fabric 610 or the ingress/egress functionality and physical partitioning of linecards 621-624.

Note that each linecard 621-624 has a corresponding link 631-634 to central switch fabric 610. Only one link per linecard is depicted in FIG. 6, but this is only for purposes of providing a simple example. As before, the links of FIG. 6 are merely representative of a line or combination of lines and components that interconnect linecards 621-624 with switch fabric 610, and should not be viewed in a restrictive sense. System 600 may include linecards 621-624 having multiple links per linecard to central switch fabric 610. The number of links may depend on the physical implementation of system 600, such as how many physical and/or logical devices constitute central switch fabric 610, and/or size of the frames and/or cell size.

Each link 631-634, and other links that may be present in other embodiments not shown in FIG. 6, transmits cells to central switch fabric 610 in a frame structure. At the beginning of each frame each linecard 621-624 will transmit a cell 0 on timeslot 0 of frames 641-644, then a cell 1 on timeslot 1 of frames 641-644, continuing until cell N on timeslot N of frames 641-644. At the end of frames 641-644, linecards 621-624 will begin new frames 651-654 according to a synchronized timing signal in system 600. Thus, they will begin sending a cell 0 on timeslot 0 of frames 651-654, and so forth. More frames will be sent as long as links 631-634 have active connections between linecards 621-624 to central switch fabric 610. In this context, the synchronized timing signal refers back to the discussion of synchronization mechanisms made above with reference to FIG. 5. Also, in one embodiment of system 600, deskew buffers may be used to correct timing offsets that may exist on links 631-634 due to differing physical link characteristics.

Each timeslot of each frame 641-644 includes a cell directed to an egress device (e.g., a queue on linecards 621-624 operating in egress mode), with the egress device indicated in FIG. 6 by the number of the linecard 621-624 in each timeslot. In FIG. 6, "1" to "M" indicate a cell of TDM traffic directed to a linecard 621-624 of corresponding number, "D" indicates timeslot availability for data arbitration (PDU traffic that will be scheduled by a scheduler in central switch fabric 610 for egress at a linecard 621-624), and "X" indicates that the timeslot is not usable for either data arbitration or TDM traffic (it is blocked based on an allocation algorithm, as mentioned previously, to prevent conflicts at central switch fabric 610).

Note that cells located in the same timeslot of their respective frames 641-644 and 651-654 are all directed to different egress linecards, or to no linecard at all. For example, assuming that the cell in the timeslot to the farthest right of frames 641-644 is in timeslot 0, there is a TDM cell on link 631 in timeslot 0 directed to linecard 2 (622), a TDM cell on link 633 in timeslot 0 directed to linecard 1 (621), and a TDM cell on link 634 in timeslot 0 directed to linecard 3 (623). Link 632 has no TDM cell at timeslot 0, because the allocation algorithm blocked timeslot 0 on link 632 as unusable to prevent TDM traffic contention. The result is that central switch fabric 610 will receive cells allocated to {2, X, 1, 3} on links 631-634, respectively, which is conflict free because no two ingress devices attempt to send traffic to the same egress device on the same timeslot.

In a similar fashion as timeslot 0 on frames 641-644, timeslot 1 on frames 641-644 has a combination including {1, 3, M, X} on links 631-634, respectively, which is also conflict free. Timeslot N−2 is allocated for data arbitration across all links 631-634, making it available for switching PDU traffic. Similar patterns of contention-free TDM cell allocation are found in all other timeslots depicted in frames 641-644 and repeated in frames 651-654. Thus, there will be no contention for TDM traffic (although PDU traffic may still experience contention), because all cells in a single timeslot are directed to different devices. PDU contention is resolved at a switch fabric central scheduler. Note again that while PDU traffic uses a central scheduler to arbitrate traffic switching, TDM traffic is scheduled, not by a central scheduler, but by the scheduling resulting from the conflict-free allocation in the populated TDM tables. Note also that in one embodiment, such as that shown in FIG. 6, each timeslot on the frames is reserved for the same traffic on every frame on a given link. Thus, FIG. 6 shows that the allocation of traffic in frame 641 and 651 are the same, as are the allocations on frames 642 and 652, etc.

The allocation algorithm reserves timeslots, and can change allocation both within the frame by swapping timeslots (time component), and by using a different link (space component). In this way there is a time-space switch overlaying switching of the cells on the packet-switched central switch fabric 610. In one embodiment this synchronized frame structure overlay is operated by a central controller that may be, e.g., a controller circuit, on a "master" linecard, on part of the fabric circuitry, etc.

Figure 7:
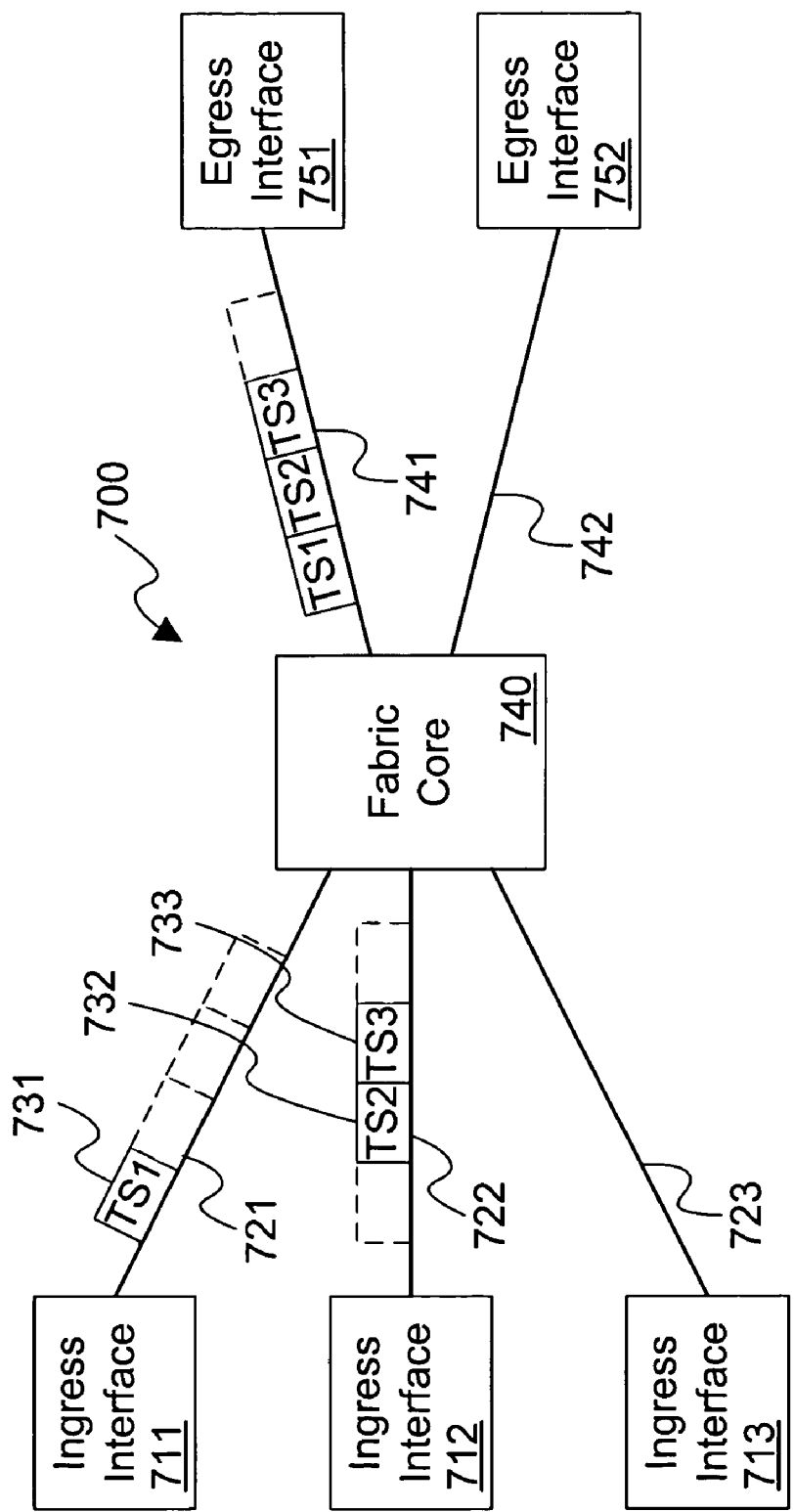
FIG. 7 is another embodiment of contention-free traffic allocation in a synchronized frame structure overlaying a packet-based fabric.

FIG. 7 is another embodiment of contention-free traffic allocation in a synchronized frame structure overlaying a packet-based fabric. System 700 includes a number of ingress interfaces 711-713, and a number of egress interfaces 751-752. The number of interfaces shown in FIG. 7 is only for purposes of simplicity in illustration. A system could include more ingress and/or egress interfaces and implement the teachings herein in a similar fashion. Fabric core 740 is a packet-switched fabric, similar to that discussed above with reference to other figures. Fabric core 740 is coupled with ingress interfaces 711-713 via links 721-723. In the example of FIG. 7, a frame of four timeslots is used, with an opportunity for one cell per timeslot. In one embodiment system 700 operates the links 721-723 according to prescheduling as discussed above, with a synchronized frame structure overlaying the packet-based switching of fabric core 740. Timeslot TS1 731 is occupied on link 721 by a cell from ingress interface 711. Likewise, timeslots TS2 732 and TS3 733 are occupied with TDM traffic on link 722 from ingress interface 712. Because there are four timeslots available, and system 700 only requires three timeslots to switch the TDM traffic load, a fourth timeslot TS4 could be occupied each frame with PDU traffic.

Consistently with the previously mentioned embodiments, TDM tables in ingress interfaces 711-712 and egress interface 751 may be populated with the address of egress interface 751 on entries corresponding to certain of the first three timeslots TS1-TS3, and a remaining entry could be marked "D" for PDU switching. Certain of the timeslots reserved for TDM traffic (TS1-TS3) may be marked "X" on tables on interfaces 711-712 and 751, making an entry unusable for either TDM or PDU traffic. If in this same scenario ingress interface 713 was prepared with PDU traffic sufficient to occupy every timeslot, only 25% of its ready traffic could be switched, even though egress interface 752 will sit idle during essentially the entire frame.

In one embodiment, system 700 is capable of determining that egress device 752 is not being utilized for egress TDM traffic, and is able to allow data traffic to be switched through fabric core 740 at the same time deterministic TDM traffic is being switched through the core. In such an embodiment, system 700 could be modified to allow for PDU arbitration in any timeslot, as long as the PDU traffic is destined for devices that will not cause contention with TDM traffic. Thus, rather than marking certain entries in certain TDM tables as "X," no entries are marked as unusable, and the system determines what PDU traffic is ready that can be switched in a way to avoid contention in the TDM traffic. This could potentially allow four cells of PDU traffic from ingress interface 713 to be switched over the time period of the four-timeslot frame when there will also be three cells of TDM traffic from ingress interfaces 711-712 during the same period. This allows for an improved switching efficiency for data traffic through the fabric.

Figure 8:
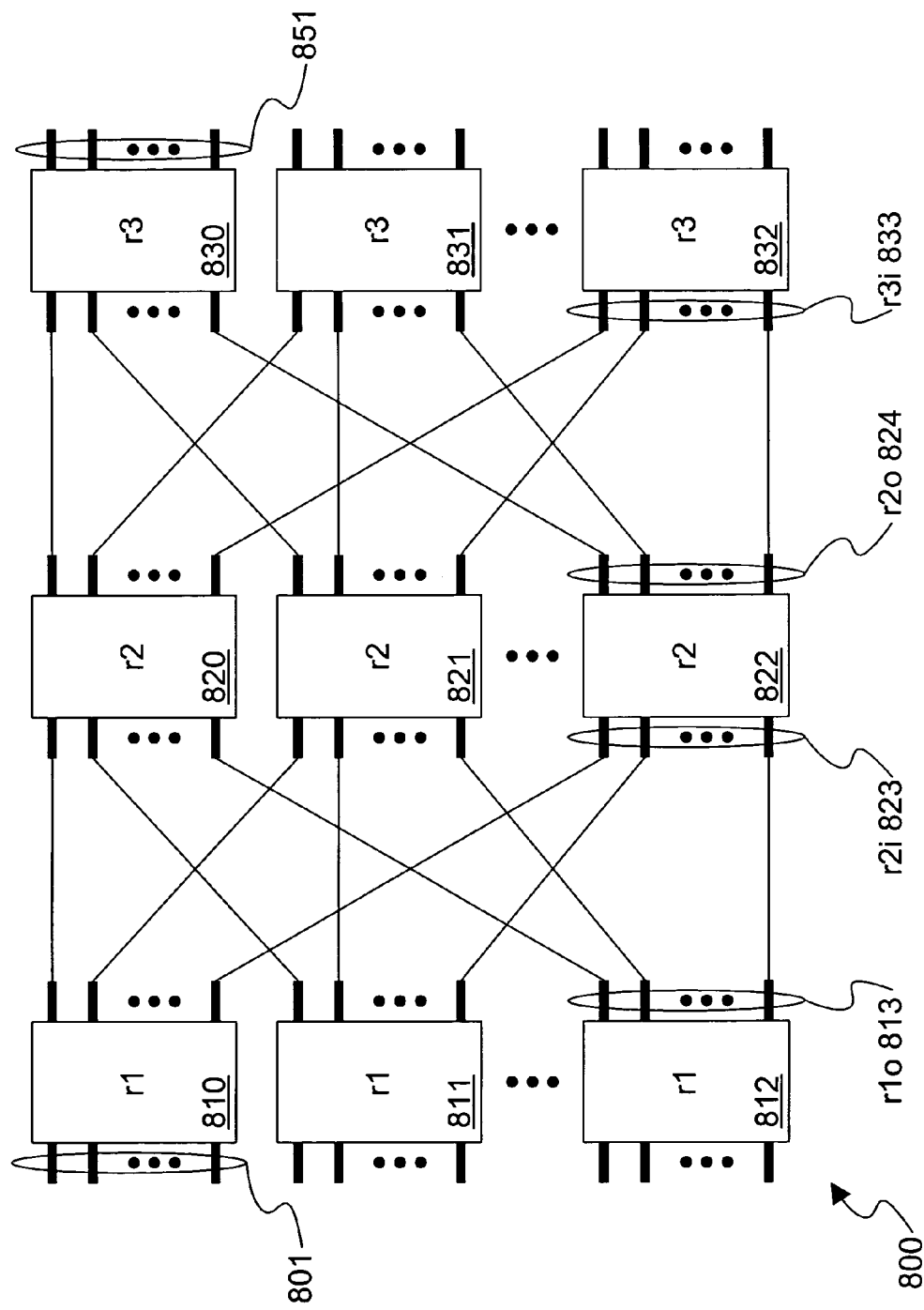
FIG. 8 is one embodiment of a Clos network configuration.

FIG. 8 is one embodiment of a Clos network configuration. Embodiments of the invention described herein may be viewed as a Clos network. Clos networks involve building up larger port count switches from smaller sized switch elements. Because of the graphical depiction of Clos networks, it is often assumed that the elements in each stage of the network are discrete crossbars, when in fact the switch elements may also be time-based switches. Thus, in FIG. 8, the elements r1 810-812 may be discrete devices with a number of inputs 801, or may be time-based switches, with a single input divided into a number 801 of timeslots, or some combination thereof.

A Clos network requires that each stage r1 810-812, r2 820-822, and r3 830-832 fully interconnect to adjacent stages. Thus, as shown in FIG. 8, stage r1 fully interconnects with stage r2, which in turn fully interconnects with both stages r1 and r3. For simplicity, only a symmetric network is described, with each ingress stage r1 and egress stage r3 having the same number of elements, because the number of ingress ports 801 matches the number of egress ports 851. Stage r2 would have a number of input ports r2$i$ 823 and output ports r2$o$ 824 to match the number of elements in the adjacent stages. A Clos network may also be designed to have fabric speed up, where fabric stage r2 has a number of input ports r2$i$ 823 greater than the number of system ingress ports 801.

In one embodiment system 800 has 192 ingress ports 801 with which to receive 192 STSs (Synchronous Transport Signals), or a full OC-192, and a number (e.g., 256, 312) of STS-granular timeslots available with which to cross-connect the OC-192. This can be accomplished as has been described herein. Thus, system-wide, at a first timeslot, the fabric will be physically established with a certain cross-connect pattern. At a next timeslot, the fabric cross-connect pattern will be reconfigured to allow another set of STS transfers to occur.

As a Clos network, such a system can be seen a having 192 ingress ports 801 and 192 egress ports 851, a symmetric topology. Each element 810-812 of stage r1 will have 192 inputs. There may be, e.g., 24, 32, 40, etc., elements in stage r1. Stage r2 has at least as many elements as there are timeslots. Thus, to be fully interconnecting, output ports r1$o$ 813 must be equal to the number of elements of stage r2, and the elements of stage r2 will have a number of input ports r2$i$ 823 equal to the number of elements of stage r1. Similar conditions should also exist between stages r2 and r3 for system 800 to be fully interconnecting.

To meet the deterministic requirements of switching TDM traffic, the switching should be completely non-blocking. Sometimes a speedup factor is used to assist in guaranteeing non-blocking switching of both unicast and multicast traffic. A Clos network with a number of stage r2 elements greater than the number of input ports 801 is said to have a speedup factor of one percent for every one percent additional elements in stage r2. Thus, a stage r2 that has two percent more elements than input ports produces a two percent speedup. In one embodiment a speedup may be utilized to provide support for multicast TDM traffic.

Reference herein to "one embodiment" or "an embodiment" means that a particular feature, structure or characteristic described in connection with the embodiment is included in at least one implementation of inventive concept. Thus, the disclosure should be understood as describing various embodiments of the invention, and the appearance of phrases such as "in one embodiment," or "in another embodiment" may or may not refer to the same embodiment. Besides the embodiments described herein, it will be appreciated that various modifications may be made to embodiments of the invention without departing from the scope of what is described herein. Therefore, the illustrations and examples herein should be construed in an illustrative, and not a restrictive sense. The scope of the invention should be measured solely by reference to the claims that follow.

What is claimed is:

1. A method for operating a switching node, comprising:
    maintaining a packet-switched fabric that switches both time-division multiplexed (TDM) traffic and packet-based protocol data unit (PDU) traffic on the same fabric with packet switching;
    overlaying the packet-switching of the fabric with a repeating synchronized frame, the frame to allocate timeslots for switching the TDM traffic and the PDU traffic over the packet-switched fabric, including
    maintaining a timeslot-reservation table for TDM traffic, the table having a row of entries, each entry corresponding to a timeslot of the frame;
    prescheduling switching of the fabric for TDM traffic by populating the entries in the table according to a contention-free allocation to provide exclusive reservation of timeslots in the frame for cells of TDM traffic to provide deterministic switching of TDM traffic over the fabric based on the prescheduling of the frame; and
    scheduling switching of the fabric for PDU traffic by arbitration scheduling of available timeslots in the frame; and
    switching both the TDM traffic and the PDU traffic over the packet-switched fabric traffic in accordance with the repeating synchronized frame, including transmitting a cell on a timeslot in accordance with the populated table.

2. A method according to claim 1, wherein overlaying the packet-switching of the fabric with the synchronized frame further comprises providing a contention-free allocation in time and space of TDM traffic using a Slepian-Duguid-based algorithm.

3. A method according to claim 1, wherein maintaining the table comprises maintaining the table with a central management that manages tables of multiple switch interface devices in a system.

4. A method according to claim 1, further comprising providing a synchronization signal to demark the frame.

5. A method according to claim 1, wherein overlaying the packet-switching of the fabric with the synchronized frame further comprises providing distributed switching of TDM traffic from multiple sources of TDM traffic over the fabric.

6. A method according to claim 1, wherein populating the table comprises populating a TDM timeslot reservation table, and further comprising:
    preventing PDU traffic from being transmitted on a timeslot that is reserved for TDM traffic;
    determining whether an egress device has bandwidth that is not reserved for TDM traffic by TDM timeslot reservations; and
    transmitting PDU traffic to the egress device if the egress device has available bandwidth that does not contend with the TDM traffic reservations as a result of the determination.

7. A method according to claim 1, the packet-switched fabric having a Clos network configuration.

8. A switching system comprising:
    a packet-switched switching fabric that switches both time-division multiplexed (TDM) traffic and packet-based protocol data unit (PDU) traffic on the same fabric with packet switching;
    multiple switch interfaces having a timeslot-reservation table for TDM traffic, the table having a row of entries, each entry corresponding with a timeslot on a frame, the frame to allocate timeslots for switching the TDM traffic and the PDU traffic to preschedule switching of the fabric for TDM traffic by populating the entries in the table according to a contention-free allocation to provide exclusive reservation of timeslots in the frame for cells of TDM traffic to provide deterministic switching of TDM traffic over the fabric based on the prescheduling of the frame, and the frame to further schedule switching of the fabric for PDU traffic by arbitration scheduling of available timeslots in the frame, the multiple switch interfaces to transmit cells of traffic in accordance with the entries in the table; and a switch management circuit to define the frame and synchronize switching of traffic over the fabric that switches both the TDM traffic and the PDU traffic in accordance with the frame.

9. A system according to claim 8, wherein the switch management circuit provides modifications of the table to the multiple switch interfaces.

10. A system according to claim 8, wherein the switch management circuit to synchronize the switching of traffic over the fabric further comprises the switch management circuit to provide a synchronization signal to the switch fabric and the multiple switch interfaces to demark the frame.

11. A system according to claim 8, wherein the multiple switch interfaces are directly inter-connectable for system input to system output via the timeslots on the frame synchronized by the switch management circuit.

12. A system according to claim 8, wherein the packet-switched switching fabric further prevents PDU traffic from being transmitted on a timeslot that is reserved for TDM traffic, determines whether an egress device has bandwidth that is not reserved for TDM traffic by TDM timeslot reservations, and transmits PDU traffic to the egress device if it is determined that the egress device has available bandwidth that does not contend with the TDM traffic reservations.

13. A system according to claim 8, wherein the switch fabric comprises multiple discrete switching circuits.

14. A system according to claim 8, wherein the multiple switch interfaces comprise multiple ingress/egress linecards.

15. A system according to claim 8, wherein the switch management circuit comprises a switch management linecard having a circuit to generate a synchronization signal and a circuit to provide management of the table.

16. A system according to claim 8, the packet-switched switching fabric having a Clos network configuration.

17. A system according to claim 8, wherein the contention-free allocation in time and space is generated using a Slepian-Duguid-based algorithm.

* * * * *